DRAG COEFFICIENT OF VARIOUS SURFACE COVERINGS
AS A FUNCTION OF REYNOLDS NUMBER, R

INVENTOR.
FITZHUGH W. BOGGS

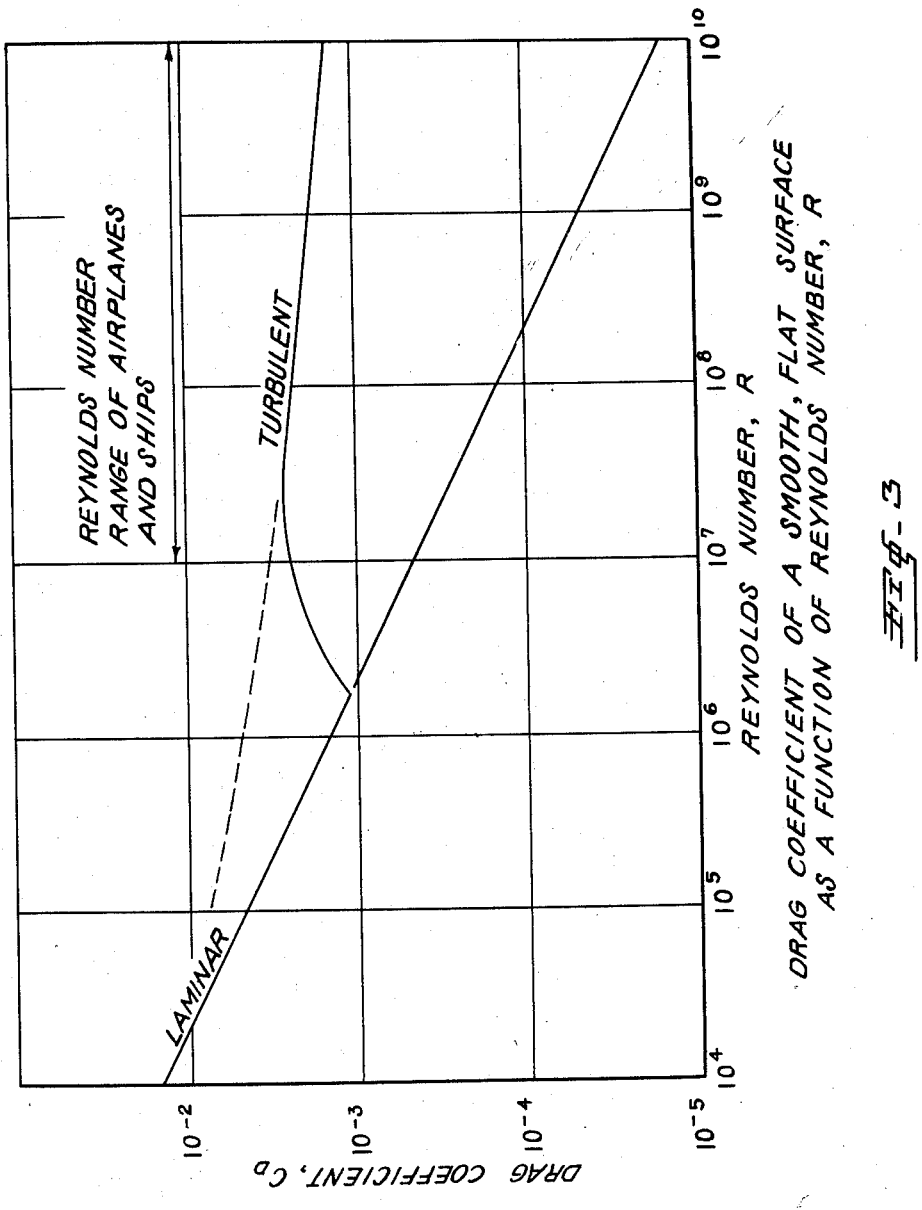

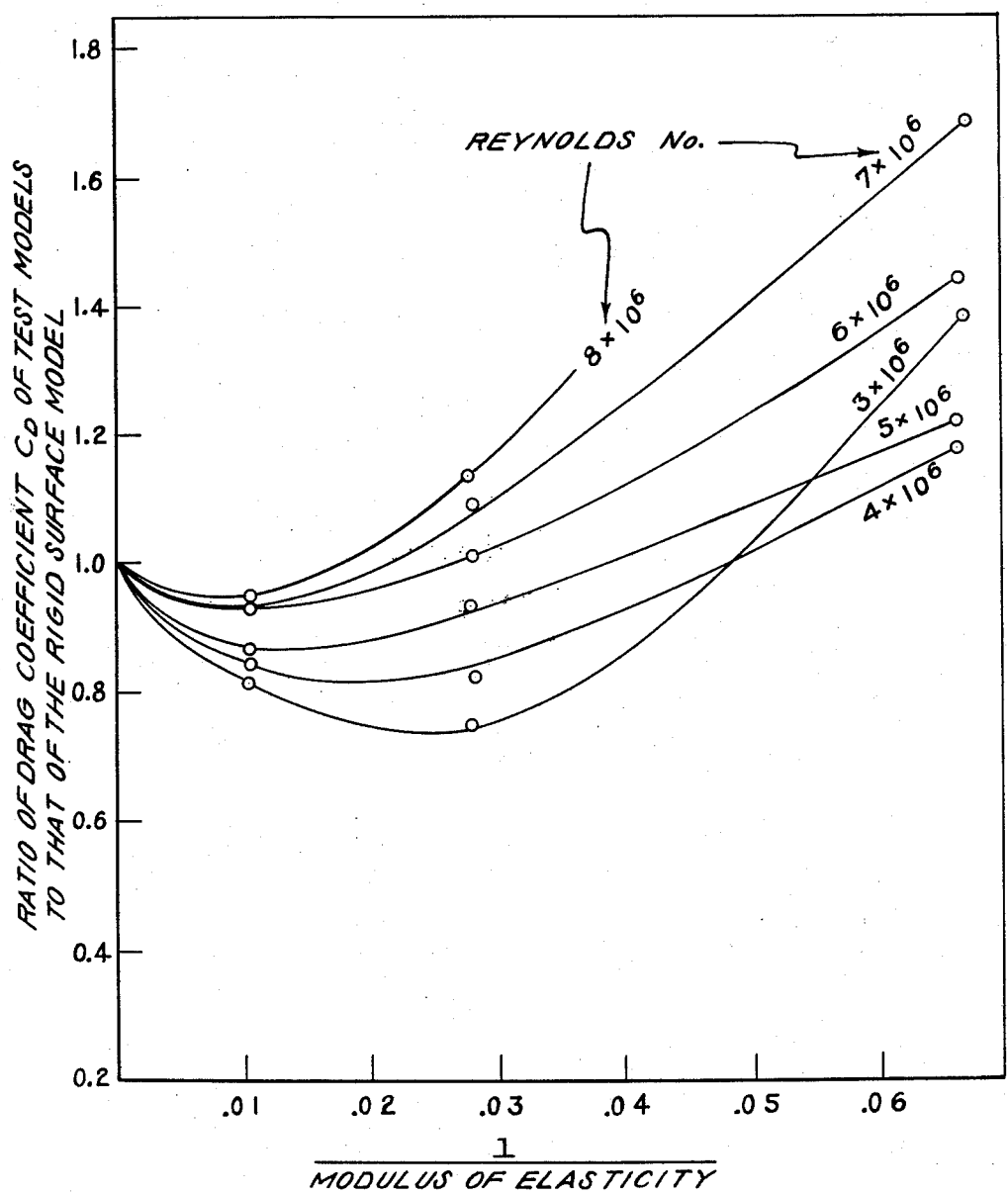

United States Patent Office 3,076,725
Patented Feb. 5, 1963

3,076,725
COATED OBJECT HAVING REDUCED FRICTIONAL DRAG IN LIQUIDS
Fitzhugh W. Boggs, Upper Montclair, N.J., assignor to United States Rubber Company, New York, N.Y., a corporation of New Jersey
Filed Jan. 30, 1958, Ser. No. 712,216
1 Claim. (Cl. 117—121)

This invention relates to a method of reducing the frictional drag on an object moving in a fluid medium. It is specifically directed to a method for damping out turbulence along the object's fluid-contacting surfaces and thus maintaining laminar boundary layer flow under conditions where turbulent boundary layer flow would otherwise prevail. The fluid medium may be either gaseous or liquid.

Adherence of fluid particles to the surface of a solid body moving in a contiguous fluid results in the formation of what is known as a boundary layer. The nature of this boundary layer along the surface of the body, for example along the surface of an airplane in flight or along the submerged surface of a boat in motion, is a controlling factor in the determination of the skin friction, or drag. Where the boundary layer is smoothly flowing, or laminar, this skin friction or drag is generally low. However, where this boundary layer is agitated, or turbulent, the drag on the object in the fluid is considerably increased. One of the prime objectives of aerodynamic and hydrodynamic research has been, and still is, to prevent this boundary layer from becoming turbulent, that is, to maintain laminar boundary layer flow adjacent the surfaces of the object. The problem in general is described as boundary layer stabilization.

For flow in which bodies are fully immersed in a fluid, the ratio of the inertia or kinetic forces experienced to the viscous forces is proportional to a quantity known as Reynolds number. The nature of any particular flow of a real fluid may be judged to some extent from the corresponding Reynolds number. A small Reynolds number indicates that viscous forces predominate, whereas a large value for Reynolds number indicates that inertia or kinetic forces predominate. It is well known that boundary layer flow along a smooth solid surface is laminar with consequent minimum frictional drag below a certain Reynolds number, which may be termed the critical Reynolds number. Above this point lies a transition range leading to fully turbulent boundary layer flow and consequently greatly increased frictional drag. It is apparent that drastic reductions of the frictional drag can be expected once the problem is solved of preventing the boundary layer from turning turbulent at large Reynolds numbers.

The transition from laminar to turbulent flow is caused by a gradual change in the dynamic stability of the boundary layer itself. At low Reynolds numbers, the relatively great inherent viscous friction in the fluid adjacent to the surface of the body rapidly damps out any disturbance and keeps the boundary layer flow reliably laminar or stable. However, since we have seen that Reynolds number is proportional to the ratio of the inertia or kinetic forces to the viscous forces, above a certain Reynolds number the kinetic forces predominate. Thus, the inherent damping due to viscous friction becomes insufficient to damp out any disturbances adjacent to the surface of the body, and this results in a dynamic instability of the boundary layer. When this instability has developed to a certain extent, minute disturbances will be amplified until the entire boundary layer is in wild motion or turbulent.

Various devices and methods have been developed in the prior art to stabilize this boundary layer, that is, to favor laminar flow at Reynolds numbers above the usual critical value. The application of suction to the surface of a body has been found to decrease the boundary layer thickness and hence to decrease the frictional drag. Many investigations, primarily on wing sections, have been made in which suction is applied through slots in the surface. (One of the most complete studies is that by Werner Pfenninger, "Investigations on Reductions of Friction on Wings in Particular by Means of Boundary Layer Suction," NACA TM 1181, 1947). One disadvantage of such a solution is that these suction slots in the surface must be relatively fine for the sake of surface smoothness and such fine slots clog too easily.

Another means of stabilizing this boundary layer that has been tried is based on the principle of energy absorption by means of artificial surface damping. This theory was proposed by Max O. Kramer in his article "Boundary-Layer Stabilization by Distributed Damping," Journal of the Aeronautical Sciences, June 1957, pp 459–460; and is the subject of a patent application by him, Serial No. 548,794, filed November 23, 1955, for Means and Method for Stabilizing Laminar Boundary Layer Flow, and now abandoned. The object of this approach is to the general problem of boundary layer stabilization is to provide a type of surface for a solid body that will function automatically and without added power to extend laminar flow over the usual transition range of Reynolds numbers and beyond into the usual turbulent range. This approach seeks to provide a surface that will not only maintain laminar boundary flow, but will also tend to restore laminar boundary flow whenever disturbing factors have upset the equilibrium.

The Kramer solution is based on the fact that, before the boundary layer of a smooth flat surface turns turbulent, it selectively amplifies a certain critical waviness which when reaching a critical amplitude, breaks up into a turbulent motion. (This was shown by Schubauer and Skramstad in their paper "Laminar Boundary-Layer Oscillations and stability of Laminar Flow," Journal of the Aeronautical Sciences, volume 14, No. 2, February 1947; and by Schlichting in "Amplitudenverteilung und Energie Bilanz der kleinen Störungen bei der Plattenströmung," Nachrichten der Gesellschaft der Wissenschaften, Gottineen M.P.K., vol. 1, pp. 47–78, 1935.) This waviness of the boundary layer induces pressure oscillations when passing by any one point of the surface. If a damping medium is placed on the surface of the submerged or immersed body which can respond to these pressure oscillations, this introduction of artificial damping will increase the stability of the boundary layer and, therefore, permit it to remain laminar at greater Reynolds numbers. Thus, the development of a damping surface covering that responds to these minute pressure oscillations and yet does not interfere with the requirements of an ideally smooth surface is a feature of the Kramer approach.

Kramer proposed for his artificial damping means a pressure-responsive surface structure of cellular construction. It was characterized by numerous internal cavities and was filled with a fluid of the same general character as the boundary layer fluid but generally of higher viscosity. This fluid-filled, multiple-layer, surface structure was provided with numerous internal passages for pressure communication for response to the oscillation of the pressure of the boundary layer under critical conditions. It was bounded by a smooth, flexible, pressure-responsive, surface layer or membrane for contact with the boundary layer. Kramer's fluid-filled spaces were relatively numerous and relatively small in cross-sectional area in an outer region near the surface membrane, and were fewer and larger in cross-sectional area in the inner regions. Dissipation of energy was accomplished largely by frictional resistance to oscillating flow in these fluid-filled spaces. It is apparent that this is a difficult and expensive way to treat a surface, especially where large areas are involved. For example, to attach such a cellular structure to the surface of an airplane fuselage would be most cumbersome.

The object of this invention is to achieve this artificial surface damping by means of a surface coating that will be easy and inexpensive to apply. It will increase the stability of the boundary layer and permit it to remain laminar at high Reynolds numbers while also providing the required surface smoothness.

It is proposed to stabilize the boundary layer and thus reduce the frictional drag on an object moving in a fluid medium by applying to the object's surface a thin coating of a substance combining in itself desired rebound and elastic properties. Thus, this one coating will fulfill the functions of both Kramer's surface membrane and his fluid-filled sub-structure. It has been discovered that the application of such a thin, resilient coating results in spectacular reductions in frictional drag.

This thin resilient surface coating may be made of an elastomeric or rubbery material. To absorb a maximum of oscillatory energy when the boundary layer flow tends to turn turbulent, it must have a thickness of at least 1/16 inch and the following physical properties: (1) an energy absorption per bounce of between 0.5 and 0.9, and (2) a modulus of elasticity in the range from 25 to 350 p.s.i. Reductions of 20% in the frictional drag have been obtained in water by suitably adjusting the modulus and rebound of the resilient covering. Reductions of up to 70 to 80% are theoretically possible. To obtain this reduction, however, it is necessary that the resilient covering have a modulus of elasticity and energy absorption within the specified ranges.

Energy absorption per bounce, or rebound, is a measure of mechanical hysteresis. It may be determined, for instance, by dropping a steel ball onto a thick piece of the material out of which the covering is to be made and measuring the rebound. A rebound of 0.10 corresponds to an energy absorption of 0.90. The actual figures were obtained by dropping a 20 gram weight of one-half inch diameter guided inside a glass tube from a 4 inch height onto the covered surfaces of the models themselves. The height of the first bounce was measured. The ratio of the loss in height to the original height is a measure of the energy absorbed, or $$\text{Energy absorption} = 1 - \frac{\text{Rebound}}{\text{Original height}}$$

The modulus of elasticity is the ratio of the stress sustained by a body to the strain experienced. In the context of this specification it is defined as follows: the initial slope of the stress-strain curve is extrapolated from the origin to the abscissa representing 100% elongation. The value of the stress corresponding to this point is the "modulus" referred to throughout this specification. This is sometimes referred to as the "tangent" modulus.

This invention may be further understood by reference to the accompanying drawings, in which.

FIG. 3 is a graph on logarithmic scale showing the theoretical variation of the drag coefficient, $C_D$, as a function of Reynolds number, R, over a much greater range, and for fully laminar and fully turbulent flows; and FIG. 4 is a graph showing the variation of the ratio of the drag coefficient, $C_D$, of a surface with a resilient covering to that of a rigid surface as a function of the reciprocal of the modulus of elasticity of said resilient covering, for various Reynolds numbers.

Figure 1:
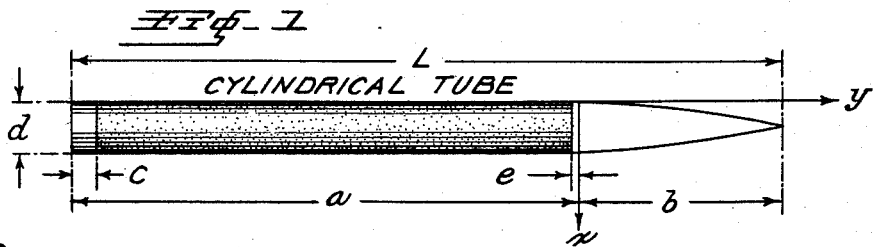
FIG. 1 is a diagram of a model used in testing the efficiency of this method of boundary layer stabilization.

To illustrate the advantages of the surface covering proposed by this invention, a model was made as shown in FIG. 1. The overall length, L, of the model was chosen to be 37.3 inches. The length of the cylindrical portion $a$ was chosen to be 26.5 inches. The length of the tip $b$ was chosen to be 10.8 inches. The outer diameter $d$ of the cylindrical portion of the model was chosen to be 2.5 inches, irrespective of the type of surface covering. The surface covering was varied only in the shaded area. This area commenced at a distance $c$ equal to one inch from the aft end of the model, and extended to a distance $e$ equal to .125 inch aft of the aft end of the tip portion. The front end of the cylindrical portion was threaded to receive a nose cone of solid nylon. The shape of the nose cone was chosen such that its boundary layer would be stabilized by a negative pressure gradient, thus insuring that a truly laminar boundary layer would be fed onto the cylindrical tube. The exact dimensions in inches of the nose cone are shown in the following table:

| $x$ | $y$ |
|---|---|
| 1.250 | 10.8 |
| 1.050 | 10.2 |
| .870 | 9.2 |
| .705 | 8.2 |
| .557 | 7.2 |
| .426 | 6.2 |
| .312 | 5.2 |
| .217 | 4.2 |
| .139 | 3.2 |
| .078 | 2.2 |
| .035 | 1.2 |
| .008 | 0.2 |

The radius of curvature at $y=10.8$ was chosen equal to 0.100 in.

The various resilient coverings chosen to illustrate this invention were applied to the models in the following manner: a cylindrical tube, which had an outer diameter smaller than the final test model's outer diameter by twice the intended thickness of the covering, was coaxially mounted in a cylindrical mold of the same length, which was fitted with a suitable closure at one end. An elastomeric compound, such as a liquid polyurethane rubber, was then poured into this annular space and cured to a solid state in situ. The outer mold shell was then removed, having been previously treated with a mold-release agent, such as a silicone oil, to prevent its adhering to the rubber. As is well known, elastomeric polyurethane compounds are usually based on polyesters or polyethers, combined with a diisocyanate as illustrated below in the description of Test Model No. 1. An example of a suitable polyester is that made by esterifying 27 moles of adipic acid with 28 moles of diethylene glycol and 2 moles of trimethylol ethane (added to introduce some branching), to provide a polyester having a molecular weight of about 2000, an acid number of about 65, and an hydroxyl number of about 2.

Three test models and one uncoated control were used to illustrate the advantages of this invention. The covering used for Test Model No. 1, which proved to be particularly effective, was a polyurethane rubber, made by mixing 700 grams of a polyester (a commercially available material known as "Multron R–26" having an hydroxyl number of 63 and an acid number of 1.4, made from adipic acid and diethylene glycol with a small amount of trihydroxy compound essentially as described above) with 55.9 gm. of toluene diisocyanate at 135° C., the mixture being poured into the mold as described above and cured overnight at 135° C. The rubbery covering so produced had a modulus of elasticity of 150 p.s.i. and an energy absorption per bounce of 0.70, thus falling well within the prescribed limits. The covering was 3/16 inch thick.

Test Model No. 2 had a coating, also cast as above described, of modulus of elasticity of 35 p.s.i., energy absorption per bounce of 0.88, and also was 3/16 inch thick. It too, was within the prescribed limits. For comparison's sake, Test Model 3 was made with a 3/16 inch rubbery covering having a modulus of elasticity of only 15 p.s.i., and therefore outside the scope of invention, and an energy absorption per bounce of 0.88.

The rubber coverings described above were made, for convenience, from liquid polyurethane rubbers by a casting technique. They could equally well have been made by known molding and finishing techniques, from solid polyurethane rubber or from any kind of natural or synthetic rubber which can be compounded to give the proper modulus and mechanical hysteresis properties. It has been found that the reduction in frictional drag obtained depends only on the physical properties of the resilient covering (in particular, modulus of elasticity and rebound) and in no way depends on the chemical composition of the rubber or the method by which it is applied. The coating should have a thickness of at least 1/16 inch to be effective.

The test model of FIG. 1 was towed through water at various speeds and the frictional drag was measured. A model of the same dimensions with a rigid surface served as a control. The results of the experiments are presented in FIG. 2 by plotting the drag coefficient, $C_D$, against the Reynolds number, R. Reynolds number, R, is computed from the formula $$R = \frac{LU_0\rho}{\mu}$$

where, $L$ = length of model
$U_0$ = speed of model in fluid medium
$\rho$ = density of fluid medium, and
$\mu$ = viscosity of fluid medium The drag coefficient, $C_D$, is defined by the equation $$C_D = \frac{D}{\frac{A_0 U_0^2}{2}}$$

where, $D$ = measured drag and
$A$ = friction surface of model

Figure 2:
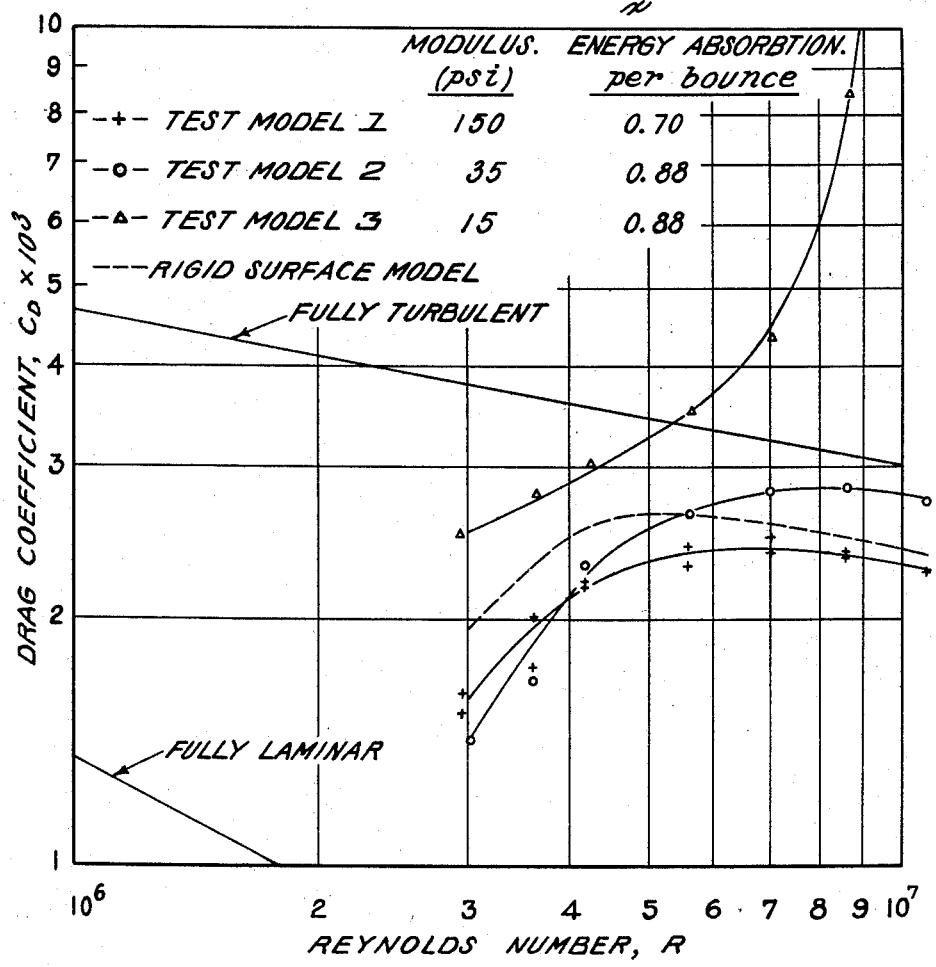
FIG. 2 is a graph on logarithmic scale showing the variation of the drag coefficient, $C_D$, as a function of Reynolds number, R, for various types of surface covering.

FIG. 2 shows, besides the results of the experiment performed, the classical $C_D$ vs. R curves for fully turbulent and fully laminar flow in the region concerned. These two curves, as well as FIG. 3, illustrate that the theoretical facts about the relationship between drag coefficient, $C_D$, and Reynolds number, R, are well known. The theoretical curves describe the friction that occurs between smooth, flat, rigid surfaces and the liquids or gases in which they are immersed. This friction, as illustrated by the drag coefficient, $C_D$, is purely a function of the Reynolds number, R, and the type of flow, laminar or turbulent. As will be seen in FIG. 3, below approximately $R = 10^6$ the friction coefficient, $C_D$, follows the laminar friction law and drops with increasing Reynolds number. Above approximately $R = 10^6$ the boundary layer suddenly turns turbulent, resulting in a sudden increase and a much slower decline of the friction coefficient, $C_D$, as Reynolds number increases. At Reynolds numbers in the range of $10^8$, the actual frictional drag in turbulent flow is fifteen times greater than it would be if the boundary layer could possibly remain laminar up to this Reynolds number. Important applications of aerodynamics and hydrodynamics, such as the motion of airplanes and ships in their respective media, involve the Reynolds number range from $10^7$ to $10^{10}$, as shown in FIG. 3. It is obvious that all these applications would greatly profit from measures which could provide a laminar boundary layer flow in the Reynolds number range mentioned.

The results of the experiments performed with Test Models No. 1 through 3 and the control are shown in FIG. 2 by curves plotted according to the stipulated legend. The test points obtained are also plotted. Test Model No. 1 proved to have better drag coefficient characteristics than the control at all speeds tested and showed a reduction in the frictional drag of up to about 20%. Test Model No. 2 showed a reduction in frictional drag at low speeds but a slight increase in drag at higher speeds. Test Model No. 3, which was outside the scope of the invention inasmuch as its modulus of elasticity was only 15 p.s.i., was completely ineffectual in reducing the frictional drag. In fact, as shown in FIG. 2, it caused a large increase in the frictional drag. It is evident, therefore, that the minimum modulus of elasticity that is effective in reducing the frictional drag is about 25 p.s.i.

The graph of FIG. 4 shows the variation of the ratio of the drag coefficient of a surface with a resilient covering to that of a rigid surface (the control model) as a function of the reciprocal of the modulus of elasticity of the resilient covering, for various Reynolds numbers. As the modulus of elasticity approaches infinity (the theoretically rigid surface covering), the reciprocal of the modulus approaches zero, and the ordinate approaches unity, as is shown by FIG. 4. The graph brings out the point that the drag coefficient, $C_D$, goes through a minimum at a certain modulus and that the position of this minimum depends on the Reynolds number. Consequently, the best choice of modulus will depend on the Reynolds number, in general the higher Reynolds numbers requiring higher modulus coverings. From the graph it is apparent that surface coverings, the reciprocals of whose moduli lie in the range between .04 and .003, are effective in minimizing the frictional drag in the Reynolds number ranges of interest here. Accordingly, the limits of 25 to 350 p.s.i. were chosen as the preferred range for the modulus of elasticity of the surface covering.

For optimum results the energy absorption per bounce should also be increased as the Reynolds number increases. The optimum range for the energy absorption per bounce should be between 0.5 and 0.9.

Surface covering of objects according to the present invention is effective in other media besides water, e.g., air, and in a wide range of Reynolds number values, including the range shown in FIG. 2 ($3 \times 10^6$ to $1.1 \times 10^7$).

This method of boundary layer stabilization will find a variety of practical applications. The frictional drag of torpedoes, underwater missiles and submarines will be reduced by the application of the principles of this invention. In connection with submarines, this form of boundary layer stabilization should be of particular interest for another reason. Beside reducing the high speed drag, it should alter the acoustic characteristics of the submarine. Due to the elimination of the turbulent boundary layer, the noise generated by the motion of the submarine will be drastically lowered. At the same time, the reflection of sonar signals will be decreased, especially when the sonar signals impinge on the submarine approximately parallel to its longitudinal axis. This acoustic effect may be so pronounced that a submarine equipped with a covering as described in this invention will be "invisible" to sonar tracking devices and, at the same time, emit so little noise that the passive tracking methods based on the noise emitted by the target, will also fail.

The bottoms of sailboats and motorboats, when treated with a covering as described by the teaching of this invention, can be made to have considerably less drag. Surf boards and water skis should also be improved.

This drag reducing technique could also be used to cut down frictional resistance on large rubber containers which may be used for transporting gasoline and oil through the ocean.

The interior, fluid-contacting surfaces of pumps and pipes could be likewise treated to increase their efficiency.

This invention should find application to airplanes in both subsonic and supersonic speed ranges. Boundary layer stabilization will improve subsonic aircraft by reducing the frictional drag. Supersonic aircraft will be improved not only by the reduction of frictional drag but also by the reduction of the heat thereby generated. Since the so-called "heat barrier" encountered at supersonic speeds is believed to be one of the most serious technical obstacles in supersonic aircraft development, this method of boundary layer stabilization may become increasingly important.

In certain instances it might be desirable to cover the surface coating of the present invention with a thin skin of a rubber (such as a neoprene) which would be resistant to oxidation and abrasion. This thin skin would detract very little from the invention's simplicity and would in some cases make a better and more useful product.

Having thus described the invention, what is desired to be claimed and protected by Letters Patent is:

An object having a thin elastomeric covering applied to its surface for reducing the frictional drag under conditions of relative movement between the object and a contiguous liquid at Reynolds numbers in the range from $3 \times 10^6$ to $1.1 \times 10^7$, said elastomeric covering being characterized by having an energy absorption per bounce of from 0.5 to 0.9, a modulus of elasticity in the range between 25 and 350 p.s.i. and a thickness of at least $1/16$ inch.

References Cited in the file of this patent
UNITED STATES PATENTS

| | | |
|---|---|---|
| 1,315,356 | Willard | Sept. 9, 1919 |
| 1,638,818 | Atwood | Aug. 16, 1927 |
| 1,848,018 | Maranville | Mar. 1, 1932 |
| 2,332,196 | Bjorksten | Oct. 19, 1943 |
| 2,621,166 | Schmidt et al. | Dec. 9, 1952 |
| 2,716,246 | Billingham | Aug. 30, 1955 |
| 2,743,465 | Vogel | May 1, 1956 |
| 2,753,319 | Brockway | July 3, 1956 |
| 2,770,612 | Schollenberger | Nov. 13, 1956 |
| 2,936,729 | Kuttner | May 17, 1960 |

FOREIGN PATENTS

| | | |
|---|---|---|
| 373,666 | Great Britain | June 2, 1932 |

OTHER REFERENCES

Vanderbilt Rubber Handbook, 1948, pp. 187, 194, 195 and 196.

Industrial and Engineering Chemistry, vol. 48, No. 1, January 1956, pp. 59 to 63.